(12) United States Patent
Margueritte et al.

(10) Patent No.: US 10,566,868 B2
(45) Date of Patent: Feb. 18, 2020

(54) ROTARY ELECTRICAL MACHINE FOR MOTOR VEHICLE

(71) Applicant: VALEO EQUIPEMENTS ELECTRIQUES MOTEUR, Creteil (FR)

(72) Inventors: David Margueritte, Wailly Beaucamp (FR); Henri Delianne, Maresville (FR); Pierre-Yves Bilteryst, Brimeux (FR)

(73) Assignee: Valeo Equipments Electriques Moteur, Creteil (FR)

( * ) Notice: Subject to any disclaimer, the term of this patent is extended or adjusted under 35 U.S.C. 154(b) by 172 days.

(21) Appl. No.: 14/893,755

(22) PCT Filed: Jun. 2, 2014

(86) PCT No.: PCT/FR2014/051289
§ 371 (c)(1),
(2) Date: Nov. 24, 2015

(87) PCT Pub. No.: WO2014/195611
PCT Pub. Date: Dec. 11, 2014

(65) Prior Publication Data

US 2016/0134164 A1      May 12, 2016

(30) Foreign Application Priority Data

Jun. 4, 2013    (FR) ...................... 13 55080

(51) Int. Cl.
*H02K 3/18*     (2006.01)
*H02K 3/52*     (2006.01)
*H02K 3/28*     (2006.01)
*H02K 15/08*    (2006.01)

(52) U.S. Cl.
CPC ................ *H02K 3/18* (2013.01); *H02K 3/28* (2013.01); *H02K 3/528* (2013.01); *H02K 15/08* (2013.01)

(58) Field of Classification Search
CPC .......... H02K 3/18; H02K 3/20; H02K 15/04; H02K 15/045; H01F 41/077
USPC ............. 310/179, 180, 194, 263; 242/118.4, 242/118.7, 159; 29/605; 174/133 R
See application file for complete search history.

(56) References Cited

U.S. PATENT DOCUMENTS 5,174,013 A    12/1992   Hiroshima et al.
5,714,822 A *   2/1998   Kawano ................... H01F 5/00
                                                      310/179

(Continued)

FOREIGN PATENT DOCUMENTS

EP    1257041    11/2002
FR    2745445     8/1997

(Continued)

*Primary Examiner* — Quyen P Leung
*Assistant Examiner* — Minki Chang
(74) *Attorney, Agent, or Firm* — Berenato & White, LLC

(57) ABSTRACT

A rotor (2), especially for an electrical rotating machine, for example for an alternator, comprising an electric winding (100) formed by at least one electric wire (101), the wire comprising: at least one first portion (104) wound as at least one turn of the winding; a transverse section with at least one flat (115) along the first portion; at least one second portion (105) allowing the connection of the winding to an electric circuit; and an essentially circular transverse section along the second portion.

18 Claims, 7 Drawing Sheets

(56) References Cited

U.S. PATENT DOCUMENTS

| | | | | |
|---|---|---|---|---|
| 6,037,694 A | * | 3/2000 | Asao | H02K 3/18 |
| | | | | 310/164 |
| 2014/0300218 A1 | * | 10/2014 | Shinosaka | H02K 13/003 |
| | | | | 310/43 |

FOREIGN PATENT DOCUMENTS

| | | |
|---|---|---|
| FR | 2928790 | 9/2009 |
| JP | H08205496 | 8/1996 |

* cited by examiner

ROTARY ELECTRICAL MACHINE FOR MOTOR VEHICLE

CROSS-REFERENCE TO RELATED APPLICATIONS AND CLAIM TO PRIORITY

This application is a national stage application of International Application No. PCT/FR2014/051289 filed Jun. 2, 2014, which claims priority to French Patent Application No. 1355080 filed Jun. 4, 2013, the disclosures of which are incorporated herein by reference and to which priority is claimed.

Field of the Invention

The invention relates in particular to a rotary electrical machine, and in particular to an alternator or an alternator-starter for a motor vehicle.

BACKGROUND OF THE INVENTION

U.S. Pat. No. 5,174,013 describes a winding for an electrical machine with a wire with a square cross-section.

U.S. Pat. No. 5,714,822 describes a winding which combines turns of different types, with a square and a round cross-section.

Patent application FR 2 928 790 describes a coil of a winding.

SUMMARY OF THE INVENTION

The objective of the present invention is to make it possible to produce a rotor with improved performance, whilst simplifying its design.

The subject of the invention is thus a rotor, in particular for a rotary electrical machine, for example for an alternator, comprising an electrical winding formed by at least one electric wire:
  this wire having at least one first portion which is wound according to at least one turn of the winding, this wire having a transverse cross-section with at least one flattened part along this first portion;
  this wire having at least one second portion which permits connection of the winding to an electric circuit, this wire having a substantially circular transverse cross-section along this second portion.

By means of the invention, it is possible to obtain an optimum filling level, and therefore an optimum electrical performance, as a result of the suitable cross-section of the turns, whilst making it possible to use conventional connections appropriate for a wire with a circular cross-section.

The invention also makes it possible to dispense with magnets, and/or to improve the performance for ferrite magnets.

The invention also makes it possible to reduce the air space between the turns, and therefore to improve the thermal gain.

In addition, the transition of the wire, for example from round to square, makes it possible to retain the conventional stripping process.

Advantageously, the first portion of the wire is wound according to a plurality of turns.

According to an embodiment of the invention, the second portion of the wire is wound according to at least one turn.

As a variant, the second portion of the wire is wound according to at least one turn.

If required, all the turns of the wire are formed by the first portion of the wire.

If applicable, the second portion is in the extension of the first portion.

Preferably, the transverse cross-section of the first portion of the wire has at least two flattened parts.

According to an embodiment of the invention, the transverse cross-section of the first portion of the wire has a form which is substantially polygonal, and in particular substantially rectangular or triangular, for example a square or an equilateral triangle.

As a variant, the flattened parts are connected to one another by rounded sides.

Advantageously, adjacent turns of the winding are supported against one another via the flattened parts of these turns.

If required, on a plane which passes via the axis of rotation of the rotor, the winding comprises a plurality of transverse cross-sections of turns which are arranged according to rows substantially parallel to one another.

This makes possible a very satisfactory filling level.

According to an embodiment of the invention, these rows of cross-sections of turns are parallel to the axis of rotation of the rotor.

According to an embodiment of the invention, a plurality of transverse cross-sections of turns, preferably with flattened parts, are arranged in a stepped manner such as to fill to the maximum the interior of the pole pieces of the magnet wheels of the rotor.

In transverse cross-section, this stepped configuration can be in the form of a pyramid.

Preferably, the wire which forms the winding has a rectangular cross-section along its entire length, with the exception of the portions which permit the electrical connection to an electric circuit, which connection portions have a substantially circular cross-section.

For example, the winding comprises:
  turns which are radially interior with a transverse cross-section with at least one flattened part;
  turns which are radially exterior with a transverse cross-section which is substantially circular.

If required, all the turns of the winding have a transverse cross-section with at least one flattened part, with the exception of the radially outermost row of turns, in which the turns have a substantially circular cross-section.

This can permit a position of stripping of the wire for putting into place in the hooks of the collector.

According to an embodiment of the invention, the winding comprises a single wire.

Preferably, the wire comprises a connection portion which is designed to be connected to a connection lug of a collector assembly, in order to ensure the electrical connection to the circuit.

Again preferably, the rotor comprises at least one guiding unit which makes it possible to guide the connection portion.

The guiding unit can comprise at least one of the following elements: a groove, a divider, a stud.

For example, the connection portion is formed on the second portion of the wire with a substantially circular transverse cross-section.

According to an embodiment of the invention, the connection portion is formed partially on the first portion of the wire with a transverse cross-section with at least one flattened part.

The connection portion of the wire can comprise at least one loop which is wound around a stud of the guiding unit.

Preferably, the wire comprises at least one joining portion between the first portion and the second portion.

If required, the joining portion is situated between the connection lug and a first groove in the guiding unit.

For example, the joining portion is situated at the first groove of the guiding unit.

As a variant, the joining portion is situated at at least one divider of the guiding unit.

Also as a variant, the joining portion is situated between at least one divider and at least one stud of the guiding unit.

If required, the joining portion is situated at a second groove of the guiding unit.

The invention makes possible a cross-section of wire which is variable according to the winding window, and therefore it permits reduction of the play of the final turn relative to the insulator.

The invention also relates to a coil for a rotor of a rotary electrical machine comprising an electrical winding formed by at least one electric wire, which in particular is wound on a hub of the coil:
   this wire having at least one first portion which is wound according to at least one turn of the winding, this wire having a transverse cross-section with at least one flattened part along this first portion;
   this wire having at least one second portion which permits connection of the winding to an electric circuit, this wire having a substantially circular transverse cross-section along this second portion.

The invention also relates to a rotary electrical machine comprising a rotor as previously defined.

For example the machine is an alternator or an alternator-starter.

The invention also relates to a method for production of a rotor, this rotor comprising an electrical winding formed by at least one electric wire, comprising the following steps:
   forming on the wire at least one first portion with a transverse cross-section with at least one flattened part;
   winding the first portion according to at least one turn of the winding.

Preferably, the first portion of the wire with transverse cross-section with at least one flattened part is formed by applying at least one cylindrical roller on the wire.

BRIEF DESCRIPTION OF THE DRAWINGS

The invention will be able to be better understood by reading the following detailed description of non-limiting embodiments of the invention, and by examining the accompanying drawing, in which.

DETAILED DESCRIPTION OF THE PREFERRED EMBODIMENT(S)

Figure 1:
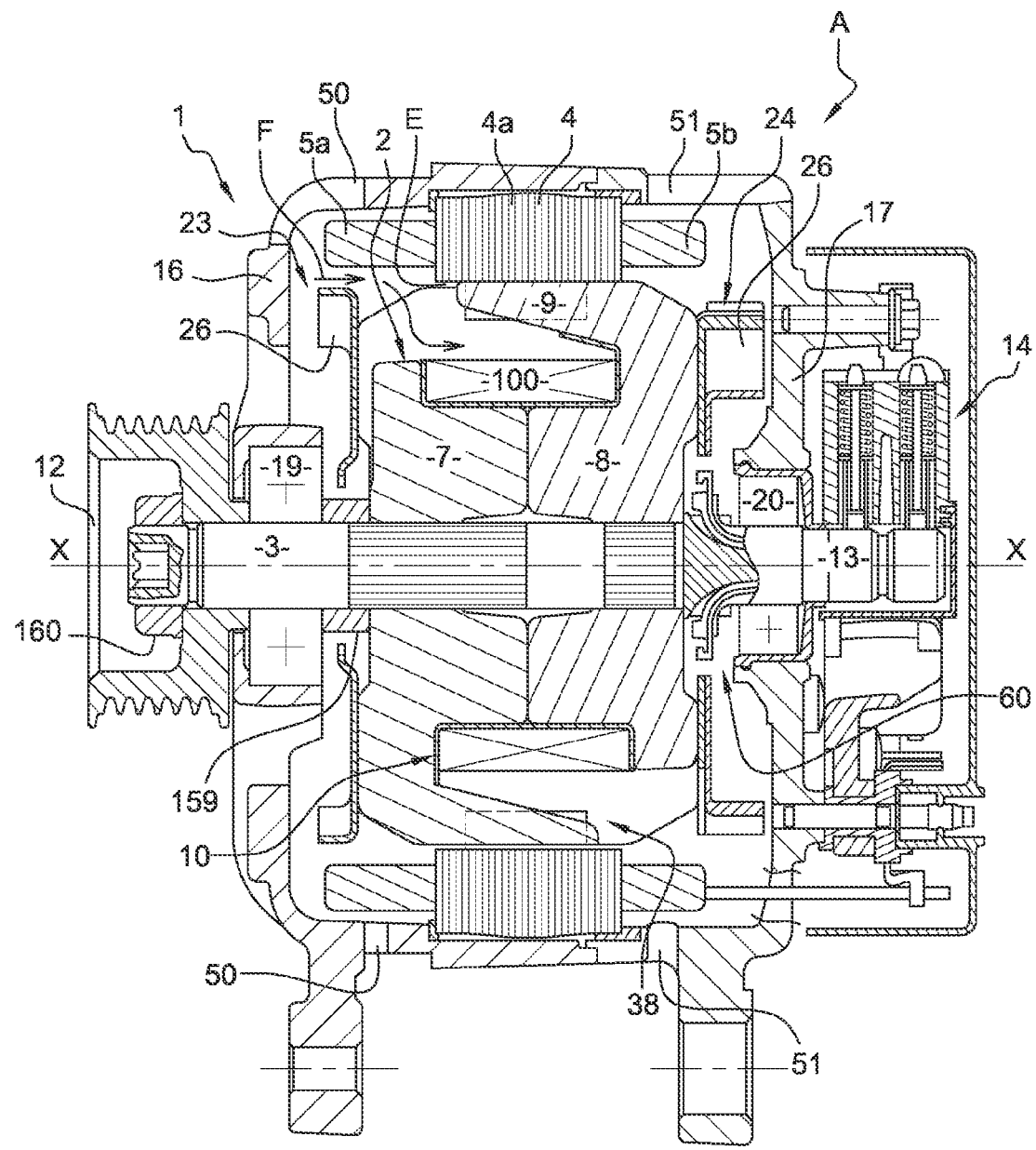
FIG. 1 represents, schematically and partially, in cross-section, a rotary electrical machine according to an embodiment of the invention.

FIG. 1 represents a compact polyphase alternator A, in particular for a motor vehicle.

This alternator transforms mechanical energy into electrical energy, and can be reversible. A reversible alternator of this type is known as an alternator-starter, and makes it possible to transform electrical energy into mechanical energy, in particular in order to start the thermal engine of the vehicle.

This alternator A comprises a housing 1, and, inside the latter, a rotor 2 with claws, which is integral in rotation directly or indirectly with a shaft 3, and a stator 4 which surrounds the rotor 2 with the presence of an air gap.

The axis X-X of the shaft 3 forms the axis of rotation of the rotor 2.

Hereinafter in the description, the orientations radial, transverse and axial are to be considered relative to this axis X-X.

The stator 4 comprises a body 4a in the form of a set of plates provided with notches, for example of the semi-closed type, equipped with notch insulators for fitting of the phases of the stator, each phase comprising at least one winding which passes through the notches in the stator body, and forming together with all the phases a front chignon 5a and a rear chignon 5b on both sides of the stator body 4a.

The windings are obtained for example from a continuous wire covered with enamel, or from conductive elements in the form of a bar, such as pins which are connected to one another for example by being welded.

These windings are for example three-phase windings connected in the form of a star or a triangle, the outputs of which are connected to at least one rectifier bridge comprising rectifier elements such as diodes or transistors of the MOSFET type, particularly when an alternator-starter is involved, as described for example in document FR A 2 745 445.

The rotor 2 comprises two magnet wheels 7, 8. Each wheel 7, 8 has a flange with transverse orientation provided on its outer periphery with teeth 9, which for example have a trapezoidal form and axial orientation. The teeth 9 of one wheel face axially towards the flange of the other wheel, the tooth of one magnet wheel penetrating into the space which exists between two adjacent teeth 9 of the other magnet wheel, such that the teeth 9 of the magnet wheels are imbricated.

The outer periphery of the teeth 9 has axial orientation, and defines together with the inner periphery of the stator body 4a the air gap E between the stator 4 and the rotor 2.

The inner periphery of the teeth 9 is inclined. These teeth 9 are thinner at their free end.

The flanges of the wheels 7, 8 have an annular form.

A cylindrical core is interposed axially between the flanges of the wheels 7, 8. In this case, this core consists of two half cores which each belong to one of the flanges.

Figure 2:
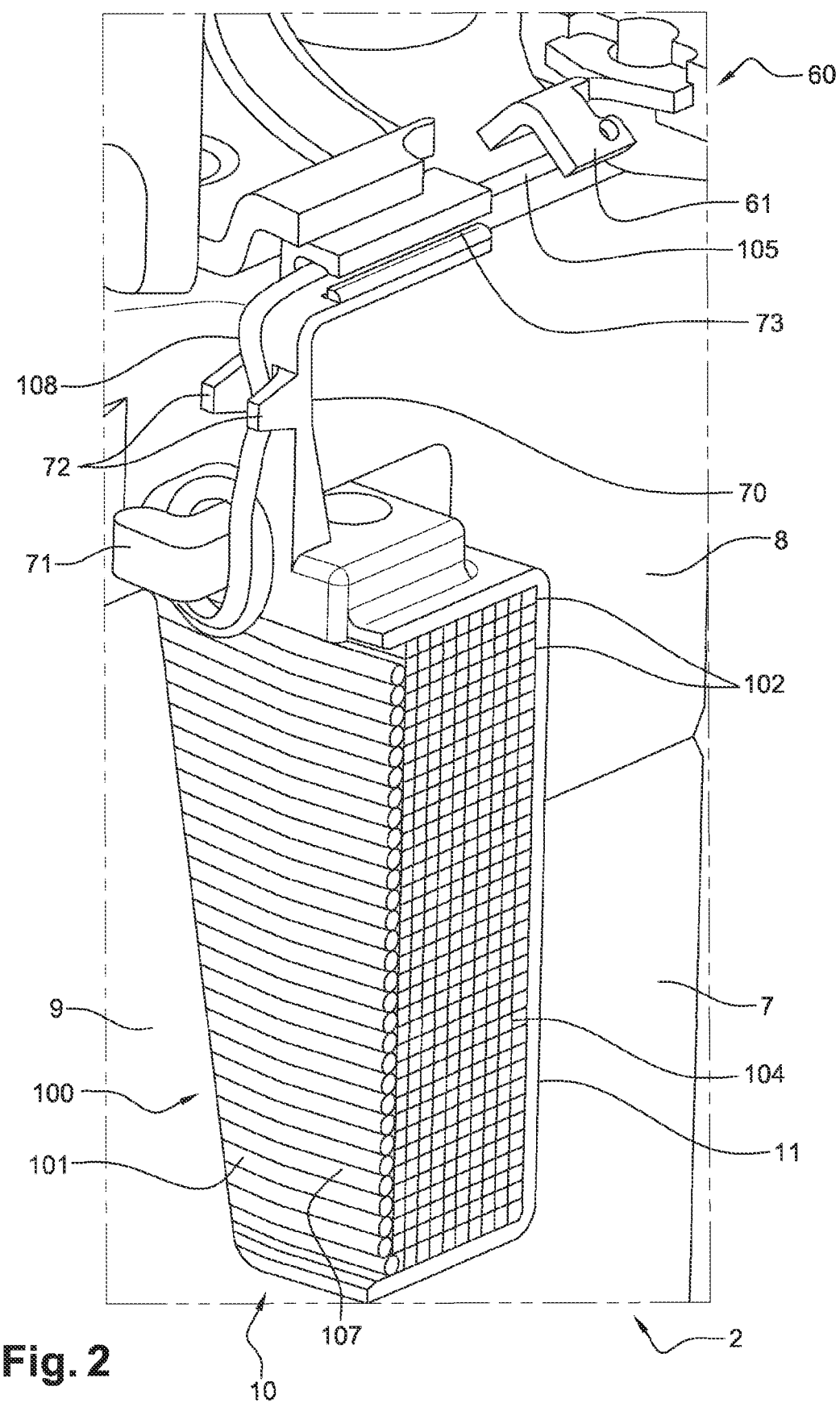
FIG. 2 represents, schematically and partially, in cross-section, a rotor of the machine in FIG. 1.

Between the core and the teeth 9, the rotor 2 comprises a coil 10 comprising a hub 11 and an electrical winding 100 on this hub 11, as can be seen in particular in FIG. 2.

In the example described, this hub 11 is made of electrically insulating material such as plastic material, whereas the magnet wheels 7, 8 and the core are metal, and in this case are made of ferromagnetic material such as mild steel. The shaft 3 is also metal, and is made of
   ferromagnetic material such as steel, harder than the magnet wheels and the core of the rotor with claws.

The housing 1 comprises front 16 and rear 17 bearings which are assembled to one another.

The rear bearing 17 supports the brush-holder, the voltage regulator and at least one rectifier bridge.

The bearing 16 and 17 have a hollow form, and each support centrally a ball bearing, respectively 19 and 20, for fitting with rotation of the shaft 3 of the rotor 2.

A pulley 12 is secured on the front end of the shaft 3, in this case by means of a nut 160 supported on the base of the cavity of this pulley 12. This pulley 12 comprises a bush which is in contact with the inner ring of the bearing 19. An annular brace 159 is interposed axially between the frontal face of the front magnet wheel 7 and the inner ring of the bearing 19. The shaft 3 passes through the brace 159 and the bush of the pulley 12.

The front end of the shaft 3 supports the pulley 12 which belongs to a device for transmission of movement to at least one belt between the alternator and the thermal engine of the motor vehicle, whereas the rear end 13 with a reduced diameter of the shaft 3 supports collector rings which are connected by wired connections to the winding 100. Brushes which belong to a brush-holder 14 are disposed such as to rub on the collector rings. The brush-holder is connected to a voltage regulator.

The collector rings belong to a collector assembly 60.

As can be seen in FIG. 2, this collector assembly 60 comprises, in addition to the collector rings, electrical connection lugs 61 which can be deformed in order to ensure the electrical connection to the winding 100.

These lugs 61 are connected electrically to the collector rings.

When the excitation winding 100 is supplied electrically from the brushes, the rotor 2 is magnetised, and becomes an inductor rotor with formation of North-South magnetic poles at the claws, and therefore at the teeth of the magnet wheels.

This inductor rotor creates an alternating induced current in the induced stator when the shaft 3 is rotating, with the rectifier bridge(s) making it possible to transform the induced alternating current into a direct current, in particular in order to supply the loads and consumers of the on-board network of the motor vehicle, as well as to recharge the battery of the said vehicle.

This rotor comprises permanent magnets 38 which are interposed between two teeth 9 adjacent to the outer periphery of the rotor.

As a variant, the rotor can be without magnets of this type.

The front 16 and rear 17 bearings comprise substantially lateral front 50 and rear 51 openings for the passage of the air, in order to permit the cooling of the alternator by circulation of air generated by the rotation of a fan 23 on the front frontal face of the rotor, and another fan 24 on the rear dorsal face of the rotor, each fan being provided with a plurality of blades 26.

The winding 100 will now be described in greater detail. As illustrated in FIG. 2 in particular, the electrical winding 100 is formed by an electric wire 101:

the electric wire 101 has a first portion 104 wound on the hub 11 to form a plurality of turns 102 of the winding 100, the electric wire 101 has along the first portion 104 a transverse cross-section with at least one flattened part 115 parallel to the axis X-X of rotation of the rotor 2, the cross-section is substantially square in the present example;

the electric wire 101 has at least a second portion 105 which permits the connection of the winding 100 to a collector assembly 60, the electric wire has a substantially circular transverse cross-section along the second portion 105.

In the embodiment in FIG. 2, the winding 100 comprises: radially inner turns 102 with a rectangular transverse cross-section;

radially outer turns 107 with a substantially circular transverse cross-section.

Figure 3:
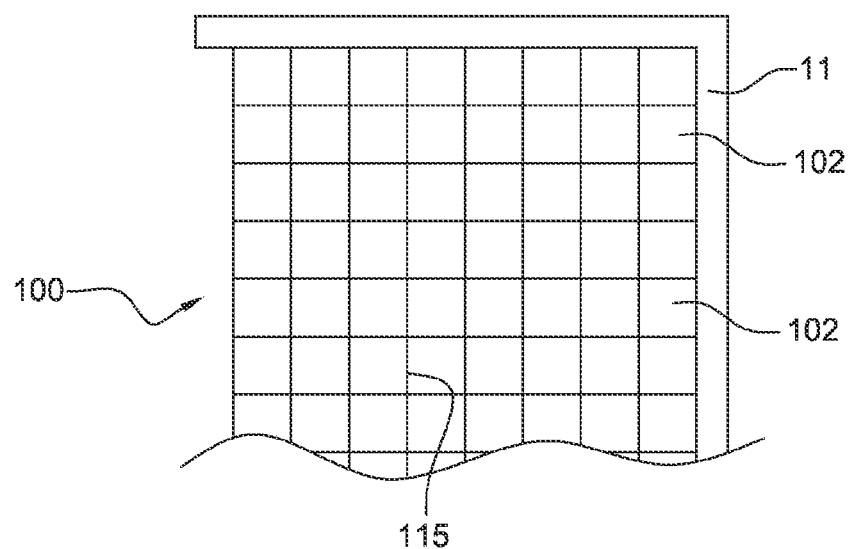
FIG. 3 represents, schematically and partially, in cross-section, an example of a winding according to the invention.

As a variant, as illustrated in FIG. 3, all the turns 102 of the winding 100 wound around the hub 11 have a rectangular cross-section.

In the example in FIG. 3, the surface area of a cross-section of wire 101 or 102 is approximately 0.5 mm$^2$ to 2 mm$^2$.

The number of parallel rows of turns in the radial direction is for example contained between 1 and 50.

The adjacent turns 102 of the winding are supported against one another via the flattened parts of these turns.

In the two embodiments of the invention in FIGS. 2 and 3, whereas all the turns of the vast majority of the turns wound around the hub 11 have a rectangular cross-section, the wire 101 has a substantially circular transverse cross-section in the connection portions 108 which are situated in the end areas of the wire 101.

As can be seen in particular in FIG. 2, each connection portion 108 is designed to be connected to one of the connection lugs 61 of the collector assembly 60, in particular by deformation of this lug 61 on the wire 101.

The rotor 2 comprises a guiding unit 70 which makes it possible to guide the connection portion 108.

In the example in FIG. 2, the guiding unit 70 comprises the following elements, in the direction of the winding 100 towards the collector 60: a bent pin 71, two dividers 72 opposite one another, and a longitudinal groove 73.

The guiding unit 70 is for example made in a single piece.

As it leaves the hub 11, the connection portion 108 of the wire 101, after the turns, is wound around the bent stud 71, then passes between the dividers 72 and into the groove 73.

In the example in FIG. 2, the connection portion 108 has a circular cross-section along its entire length.

Figure 4:
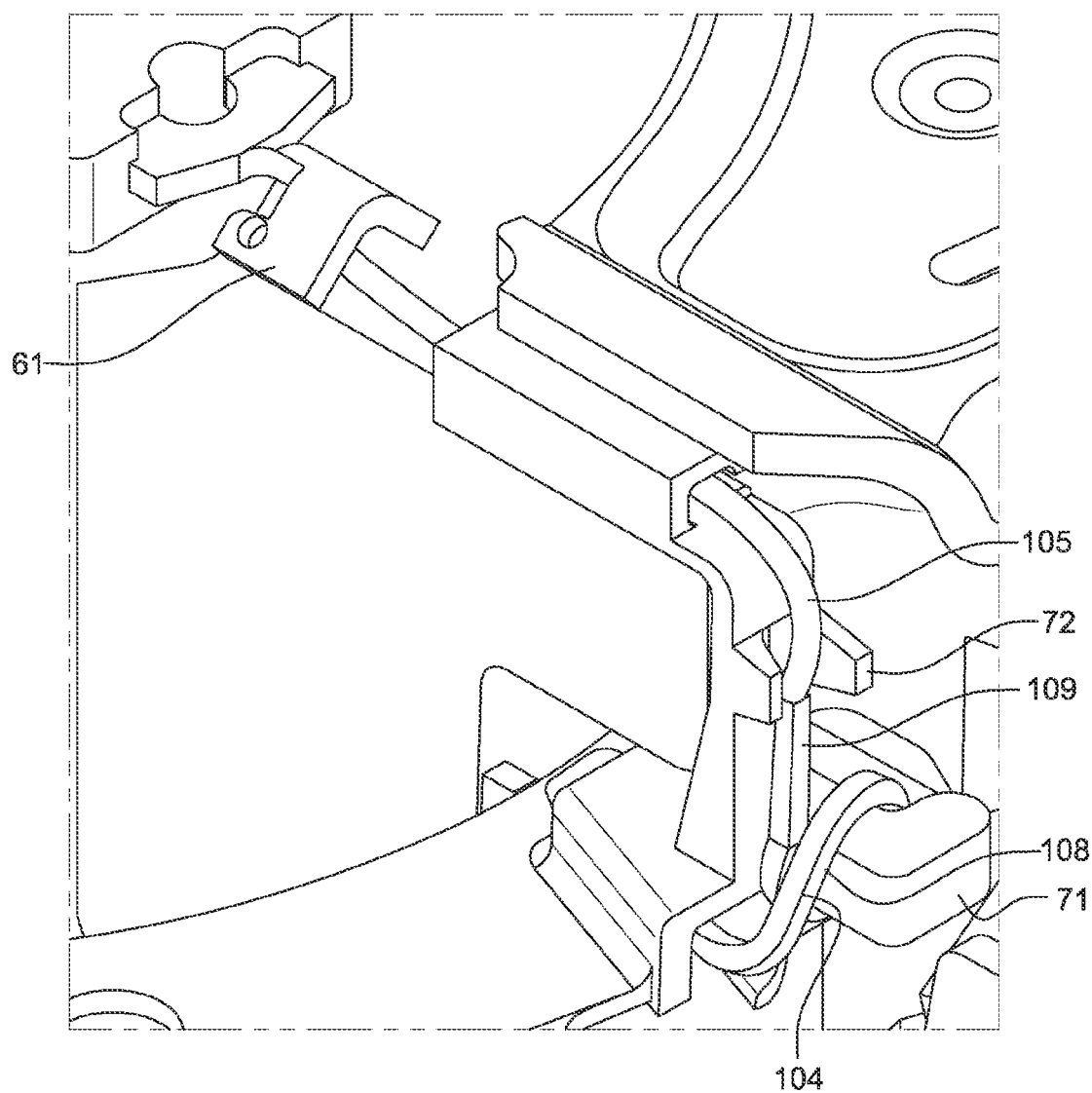
FIGS. 4 to 6 illustrate different examples of a winding according to the invention.

As a variant, as illustrated in FIG. 4, the connection portion 108 is formed partially on the first portion 104 of the wire with a rectangular transverse cross-section, and partially on the second portion 105 with a circular cross-section.

In this case, the wire 101 comprises a joining portion 109 between the first portion 104 with a rectangular cross-section, and the second portion 105 with a circular cross-section, which joining portion 109 is, in the example described, located in the interior of the connection portion 108.

In the example in FIG. 4, the joining portion 109 is situated between the stud 71 and the dividers 72.

Figure 5:
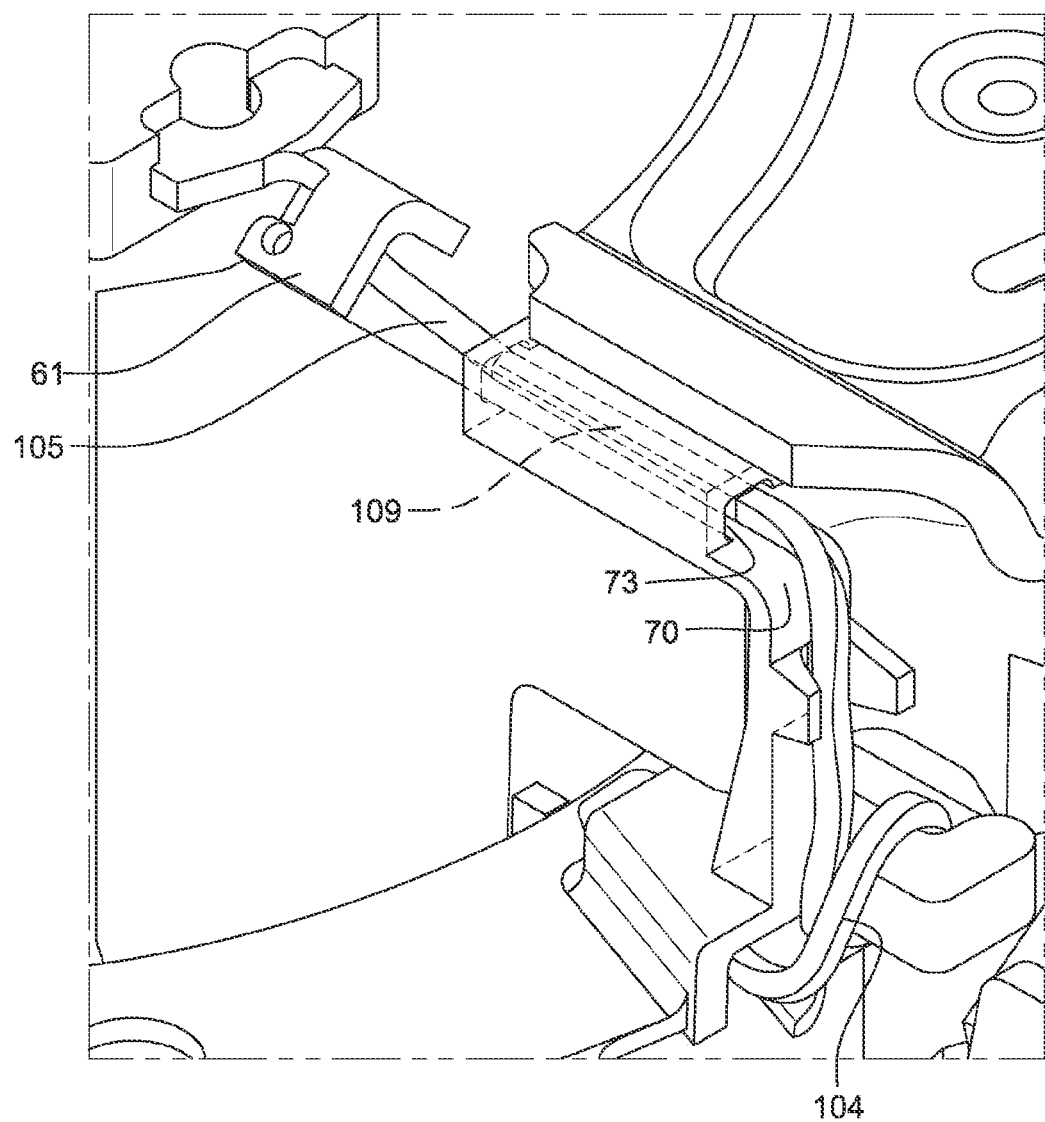

As a variant, as illustrated in FIG. 5, the joining portion 109 is situated at the groove 73 in the guiding unit 70.

Figure 6:
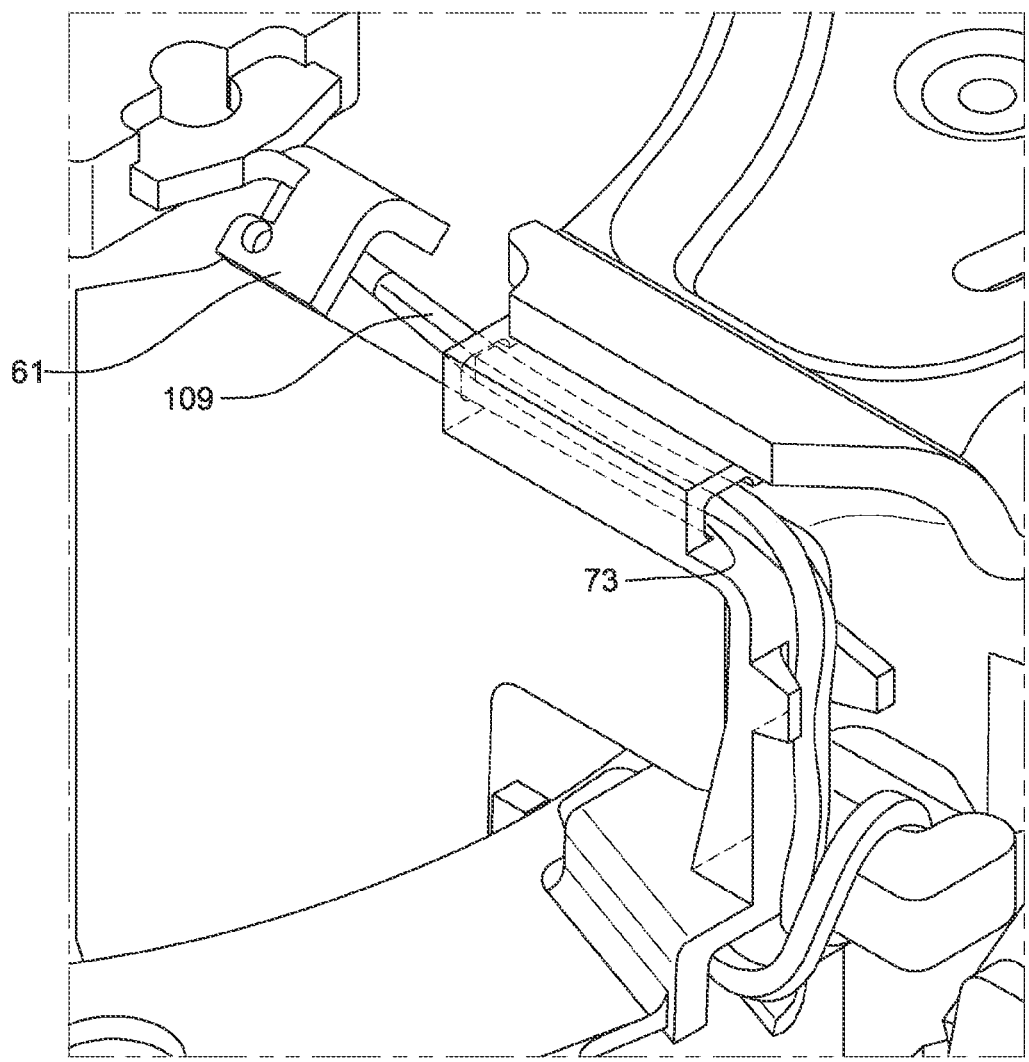

Also as a variant, as illustrated in FIG. 6, the joining portion 109 is between the groove 73 and the connection lug 61.

Figure 7:
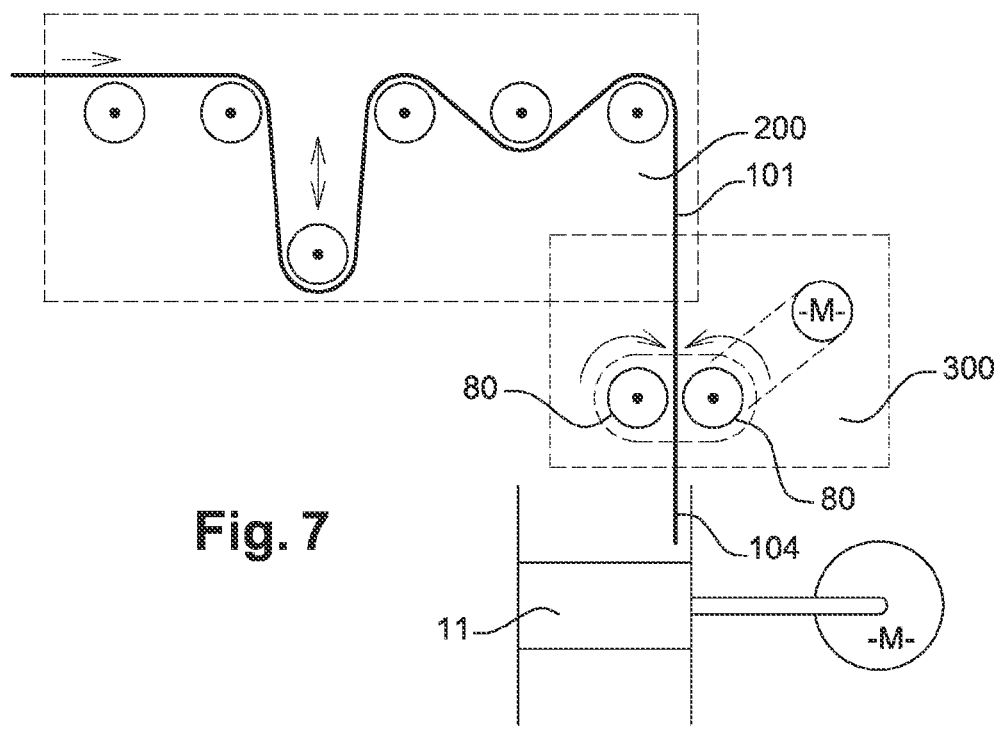
FIG. 7 shows schematically a step of production of a winding according to the invention.

FIG. 7 represents a step of a method for production of the rotor 2, i.e. forming on the wire 101 the first portion 104 with a rectangular transverse cross-section, by passing the wire 101 between two rotary rollers 80 of a forming assembly 300, in order to form the flattened parts of the portion 104 of the wire, which is wound on the hub 11.

Previously, before passing into the forming assembly 200, the wire 101 is passed into a storage device 200.

Figure 8:
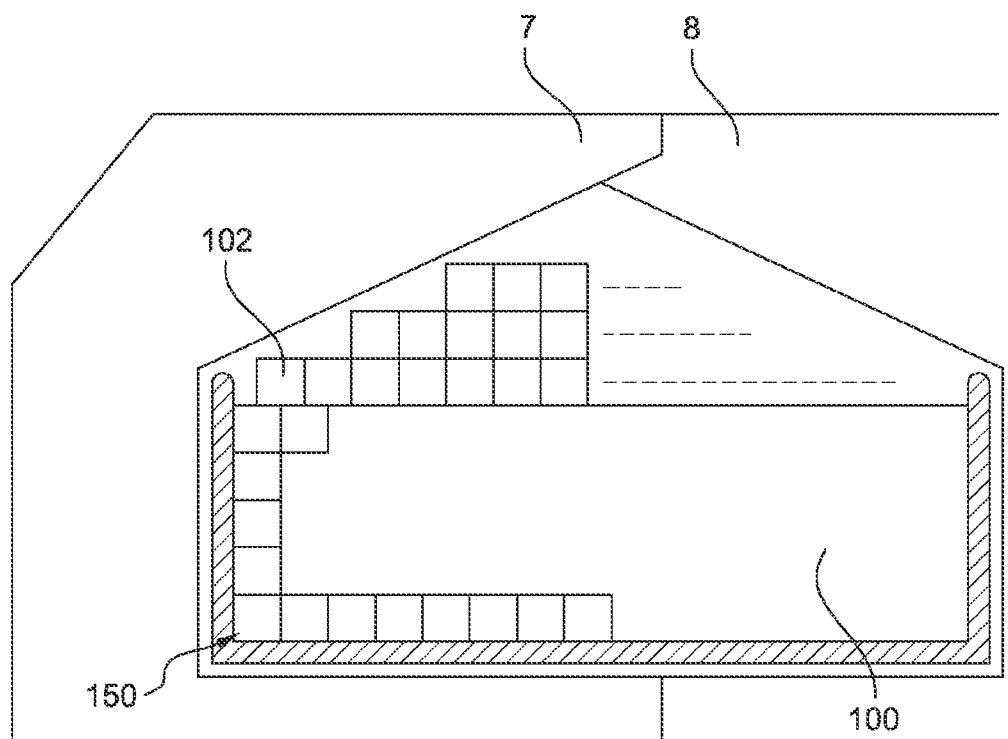
FIG. 8 illustrates another example of winding according to the invention.

In an embodiment of the invention illustrated in FIG. 8, a plurality of transverse cross-sections of rectangular or square turns 102 are disposed in a stepped manner, such as to fill to the maximum the interior of the pole pieces of the magnet wheels 7 and 8 of the rotor.

In transverse cross-section, this stepped configuration is in the form of a pyramid with a radially outer top.

An insulator 150 envelopes the turns.

The invention claimed is:

1. A rotor (2) for a rotary electrical machine, comprising:
a coil (10) comprising a hub (11) and an electrical winding (100) wound on the hub (11); and
a collector assembly (60);
the coil (10) formed by an electric wire (101) including a first portion (104) wound to form the electrical winding (100) of a rectangular cross-section, and a second portion (105) disposed outside the hub (11) and configured to connect the electrical winding to the collector assembly (60);
the first portion of the electric wire forming radially inner turns (102) of the electrical winding (100) having a transverse cross-section with at least one flattened part (115) parallel to an axis of rotation of the rotor, and a radially outer turn (107) having a circular transverse cross-section;
the electric wire having a substantially circular transverse cross-section along the second portion of the electric wire.

2. The rotor according to claim 1, wherein the transverse cross-section of the radially inner turns (102) of the first portion of the electric wire is substantially polygonal.

3. The rotor according to claim 2, wherein adjacent radially inner turns of the first portion of the electrical winding are supported against one another via the flattened parts of the radially inner turns.

4. The rotor according to claim 1, wherein adjacent radially inner turns (102) of the electrical winding are supported against one another via the flattened parts of the radially inner turns.

5. The rotor according to claim 1, wherein, on a plane perpendicular to the axis of rotation of the rotor, the electrical winding comprises a plurality of transverse cross-sections of the radially inner turns (102) which are arranged to form rows substantially parallel to one another.

6. The rotor according to claim 5, wherein the rows of cross-sections of the radially inner turns are parallel to the axis of rotation of the rotor.

7. The rotor according to claim 1, wherein the electric wire comprises a connection portion (108) disposed outside the hub (11) and configured to be connected to a connection lug (61) of the collector assembly (60).

8. The rotor according to claim 7, further comprising a guiding unit disposed outside the hub (11) and configured to guide the connection portion (108).

9. The rotor according to claim 8, wherein the guiding unit comprises at least one of the following elements: a groove (73), a divider (72), and a stud (71).

10. The rotor according to claim 7, wherein the connection portion (108) is formed partially on the first portion (104) of the wire with the transverse cross-section with at least one flattened part.

11. A rotary electrical machine comprising a rotor according to claim 1.

12. The rotary electrical machine according to claim 11, forming an alternator or an alternator-starter.

13. A coil (10) for a rotor of a rotary electrical machine, comprising:
a hub (11) of the coil (10); and
an electrical winding formed by an electric wire wound on the hub (11) of the coil (10);
the electric wire including a first portion having a plurality of turns wound on the hub (11) to form the electrical winding (100) of a rectangular cross-section, and a second portion disposed outside the hub (11) and configured to connect the electrical winding to a collector assembly (60);
the first portion of the electric wire forming radially inner turns (102) of the electrical winding (100) having a transverse cross-section with at least one flattened part (115) parallel to an axis of rotation of the rotor, and a radially outer turn (107) having a circular transverse cross-section;
the electric wire having a substantially circular transverse cross-section along the second portion of the electric wire.

14. The rotor according to claim 13, wherein the transverse cross-section of the radially inner turns (102) of the first portion of the electric wire is substantially polygonal.

15. The rotor according to claim 13, wherein adjacent radially inner turns (102) of the electrical winding are supported against one another via the flattened parts of the radially inner turns.

16. The rotor according to claim 1, wherein the radially inner turns (102) of the electrical winding have the transverse cross-section with two radially opposite flattened parts (115) each parallel to the axis of rotation of the rotor, and wherein the radially outer turn (107) has the circular transverse cross-section are disposed on one of the two radially opposite flattened parts (115) of the radially inner turns (102).

17. A rotor (2) for a rotary electrical machine, comprising:
a coil (10) comprising a hub (11), and an electrical winding (100) wound on the hub (11); and
a collector assembly (60);
the electrical winding (100) formed by an electric wire (101) having a connection portion (108) disposed outside the hub (11) and configured to be connected to a connection lug (61) of the collector assembly (60);
the electric wire including a first portion (104) having a plurality of turns wound to form the electrical winding (100), and a second portion (105) disposed outside the hub (11) and configured to connect the electrical winding to the collector assembly (60);
the first portion of the electric wire having a transverse cross-section with at least one flattened part (115) parallel to an axis of rotation of the rotor;
the electric wire having a circular transverse cross-section along the second portion;
the connection portion (108) having a circular cross-section along an entire length thereof and formed partially on the first portion (104) of the electric wire (101) with the rectangular transverse cross-section, and partially on the second portion (105) of the electric wire (101) with the circular cross-section;
wherein the electrical winding comprises:
radially inner turns (102) having a transverse cross-section with at least one flattened part (115) parallel to the axis of rotation of the rotor; and
a radially outer turn (107) having a circular transverse cross-section.

18. The rotor according to claim 17, wherein the first portion (104) forms a plurality of transverse cross-sections of turns with flattened parts, which are arranged in a stepped manner.

* * * * *